United States Patent [19]

Rehfeldt

[11] 4,277,795
[45] Jul. 7, 1981

[54] CIRCUIT ARRANGEMENT FOR DETECTING A SWITCHING PHASE

[75] Inventor: Karl H. Rehfeldt, Quickborn, Fed. Rep. of Germany

[73] Assignee: U.S. Philips Corporation, New York, N.Y.

[21] Appl. No.: 55,947

[22] Filed: Jul. 9, 1979

[30] Foreign Application Priority Data

Jul. 8, 1978 [DE] Fed. Rep. of Germany ....... 2830168

[51] Int. Cl.³ .................. H04N 5/76; H04N 9/47; H04N 5/78
[52] U.S. Cl. ............................. 358/8; 358/18; 360/37
[58] Field of Search ............... 358/4, 8, 18, 19; 360/36, 37

[56] References Cited

U.S. PATENT DOCUMENTS

| | | | |
|---|---|---|---|
| Re. 28,823 | 5/1976 | Coleman, Jr. .................. 358/8 X |
| 3,721,753 | 3/1973 | Mima ............................ 358/18 |
| 3,877,066 | 4/1975 | van Gils et al. ................ 358/18 |
| 4,024,571 | 5/1977 | Dischert et al. .............. 358/8 X |
| 4,024,572 | 5/1977 | Derenbecher, Jr. ............ 358/18 |

FOREIGN PATENT DOCUMENTS 1428973   3/1976   United Kingdom .............. 358/18

*Primary Examiner*—Bernard Konick
*Assistant Examiner*—Aristotelis M. Psitos
*Attorney, Agent, or Firm*—Thomas A. Briody; William J. Streeter; Edward W. Goodman

[57] ABSTRACT

As is known the phase of the chrominance signal is changed in a specific rhythm for the elimination of cross-talk during recording on a magnetic tape, spurious signals being cancelled via a comb filter. By means of an inverse combination stage after the comb filter an opposite signal is obtained, which with the normal output signal yields a correction signal via a differential amplifier in the case of an incorrect demodulation phase.

7 Claims, 1 Drawing Figure

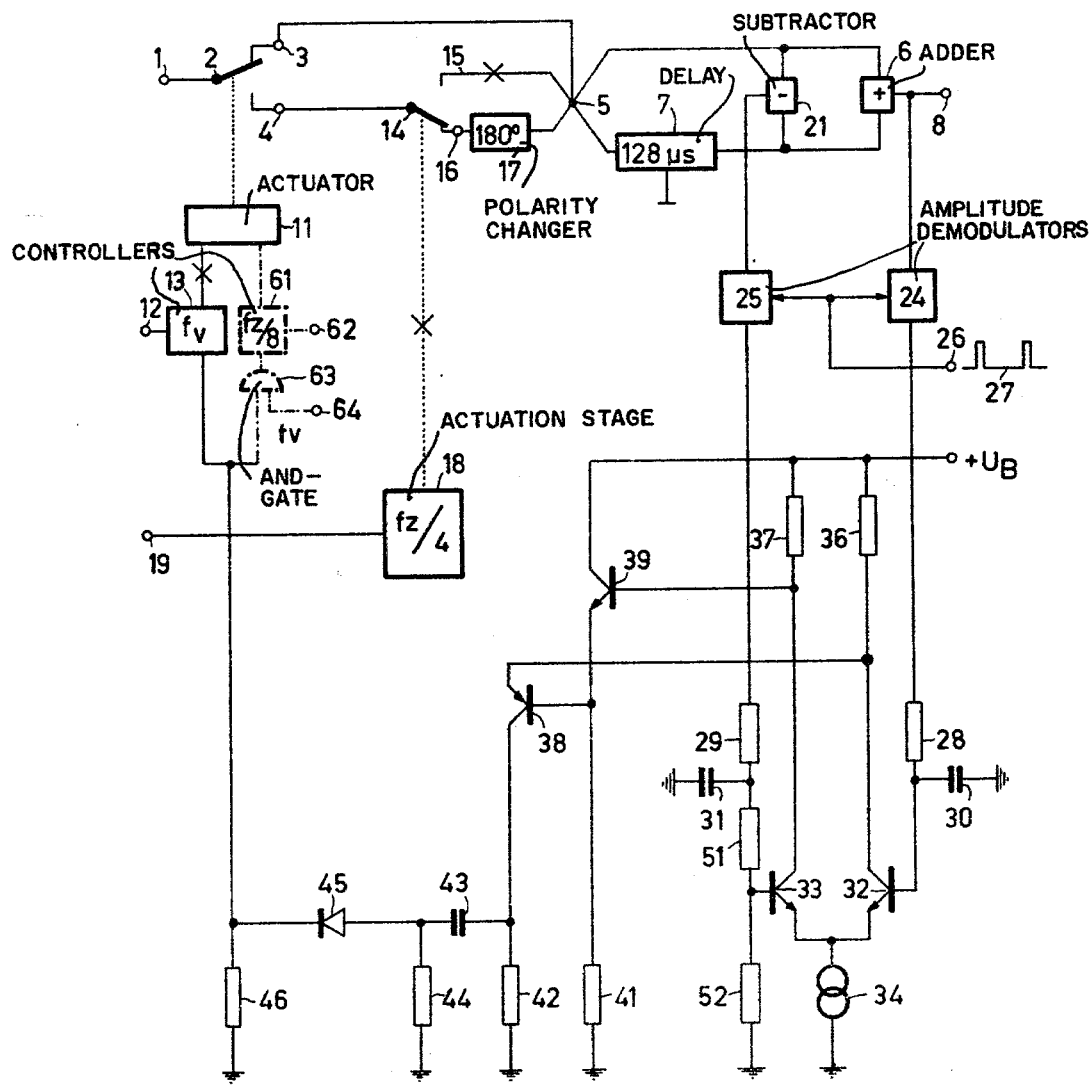

CIRCUIT ARRANGEMENT FOR DETECTING A SWITCHING PHASE

BACKGROUND OF THE INVENTION

The invention relates to a circuit arrangement for detecting the switching phase of wave trains which periodically exhibit a fixed phase difference relative to a normal condition, in particular the color synchronizing pulses of a color television signal recorded on a video tape recorder, whose polarity changes from field to field, followed by a compensation circuit, in which the pulses, which have been restored to the normal condition are combined, for example added, directly and delayed by the sampling interval, so that in the case of a correct switching rhythm the amplitude value is a maximum.

Such a switching process during the recording of a color television signal, in which the phase of the chrominance signal alternates from line to line every second field, is known from Funkschau 1976, No. 2, pages 61/62. In another recording system two lines are switched sequentially every second field, so that the phase of the relevant field changes from line pair to line pair, while in the intermediate fields the phase remains constant. Other switching systems employ greater groups, of for example four lines each, for the switching rhythm.

When the record carrier is played back the switching process should be cancelled before the signals can be processed further. In the case of a system in which the phase of the chrominance carrier and thus of the color synchronizing signal is inverted every two lines in one field and remains constant in the other field, the signals which have been switched in an opposite sense during playback are applied, directly and with a delay corresponding to two line periods, to an adder stage which supplies the output signal in which crosstalk, which may occur between two adjacent tracks recorded on the tape, is largely eliminated.

In this respect it is essential that the restoration is effected in the correct field rhythm, in conformity with the switching effected during recording, while, for example, the signal of the other field should be transferred without any change.

For the identification of the field that has been subject to switching, an additional signal may be transmitted, but this demands a convention (standardisation) and complicates the compatability of different apparatus.

SUMMARY OF THE INVENTION

It is the object of the invention to derive the information about the field that has been switched from the switched signals themselves.

This is achieved when, in accordance with the invention, the direct and the delayed signal are combined in a further stage in such a way that in the case of an incorrect switching rhythm a maximum amplitude values occur and when the output signals of a first and a second combination stage are applied to the inputs of a comparator, for example a differential amplifier stage, via a low-pass filter, said comparator supplies a correction signal if the pulses have the wrong phase relationship.

DESCRIPTION OF THE DRAWING

The invention is described in more detail by way of example with reference to the drawing in which an embodiment of the invention is shown in block diagrammatic form.

DESCRIPTION OF THE PREFERRED EMBODIMENT

A chrominance signal is applied from an input terminal 1 to the change-over contact of a change-over switch 2, having two outputs 3 and 4. In the position shown a connection is established to the output 3 and hence to the input 5 of a comb filter circuit; this circuit comprises two parallel branches, of which the upper branch is connected directly to the first input and the lower branch to the second input of the adder stage 6 via a device 7, which provides a signal delay of two line periods, for example 128 $\mu$secs. Thus the chrominance signals are combined in the adder stage 6 and transferred to an output terminal 8.

The change-over switch 2 is actuated via an actuation state, including an actuator 11 controlled by a controller 13, in the rhythm of the field frequency, which stage 13 receives signals of field frequency (vertical frequency) from the input terminals 12. As a result of this, the signals from the terminal 1 are transferred unmodified to the circuit point 5 via the switch output 3 during the one field and a connection is made from the input terminal 1 to its output terminal 4 via the change-over switch 2 during the other field. Subsequently, the input signals reach a change-over switch 14, whose output terminal 15 is connected directly to the circuit point 5, while the other output terminal 16 is connected to the circuit point 5 via a polarity changer 17. Every two lines, the change-over switch 14 is set to the other position by an actuation stage 18, which for example receives a control signal of the line frequency $f_z$ from the terminal 19, so that one cycle has a duration of four lines. When the first change-over switch 2 establishes a connection between the terminals 1 and 4, the input signal 1 is transferred directly to the circuit point 5 via the output terminal 15 in the one position of the switch 14, while in the other position (shown) of the switch 14 it reaches the circuit point 5 via the output terminal 16 and the phase inverter 17, i.e. 180° phase-shifted and thus with opposite polarity. The switches 2 and 14 are of an electronic type.

The circuit arrangement described so far is known and serves to eliminate or at least substantially reduce crosstalk arising between adjacent recording tracks belonging to consecutive fields, in a recording apparatus, for example a magnetic video tape recorder, by means of the comb filter circuit 5, 6, 7, 8. For this purpose the first switch 2 should be set to the correct phase, in order to ensure that the change in polarity, which is produced every two lines by means of the device 17, is obtained in the correct field. If this is not the case, the useful signals are not added and the crosstalk is not eliminated in the combination stage 6, but the useful signals will cancel each other and the spurious signals will add to each other.

In accordance with the invention this is utilized for obtaining the correct phase of the change-over switch 2, in that parallel to the first combination stage 6 there is included a further combination stage 21, in which the applied signals are not added but subtracted. If the phase is correct, this results in the useful signals being added and a substantial reduction of the crosstalk components on the output of the stage 6. Conversely, in the combination stage 21 the crosstalk components add to each other and the useful signal is largely eliminated. In the event of an incorrect phase of the switch 2 the crosstalk components are obtained on the output of the adder stage 6, while on the output of the subtractor stage 21 the useful signals are added. As the useful signals have a higher, for example at least double the amplitude of the crosstalk components obtained in the case of the other polarity, amplitude demodulation and comparison of the output signals of the stages 6 and 21 may provide a signal which indicates the correct or the incorrect phase of the switch 2. In most cases the phase position of the switch 14 is irrelevant; if desired, it may be corrected by suitable means. The invention only concerns the correction of the position of the switch 2.

The signals obtained from the adder stage 6 and the subtractor stage 21 are rectified in amplitude demodulators 24 and 25 respectively, which preferably by means of a sampling signal 27 applied via a terminal 26 are controlled so that they are operative only during the color synchronizing signal. The pulses of the sampling signal 27 appear in the intervals of the color synchronizing signal.

The output signals obtained from the amplitude demodulators 24 and 25 are respectively applied to smoothing networks respectively series resistors 28 and 29 and parallel capacitors 30 and 31, in such a way that a range of higher frequencies, which in particular may contain steep narrow interference pulses, is suppressed or strongly attenuated, and the low-pass filters thus formed only transfer a lower part of the frequency range. The signals thus obtained are respectively applied to the base input electrodes of two transistors 32 and 33, which constitute a differential amplifier, in that their emitters are interconnected and connected to the grounded pole of a supply source via a current source and a resistor 34 of high value respectively. The collectors of the transistors 32 and 33 are connected to the positive pole of the supply source $+U_B$ via respective load resistors 36 and 37 of 500 $\Omega$ each, and the voltages appearing across them drive the emitter of a pnp-transistor 38 and the base of an npn-transistor 39 respectively. The transistor 39 is connected to the power supply source $+U_B$ with its collector and is connected to ground with its emitter via a 10-kohm resistor 41, so that it operates as an emitter-follower and drives the base of the transistor 38. Thus, the transistor 38 is driven by the output of the transistor 32 on its emitter and by the output of the transistor 33 on its base via the emitter follower 39, which drives add to each other.

When the change-over switch 2 is in the correct phase position, a larger signal will appear on the output of the adder stage 6 and thus a more positive signal on the base of the transistor 32, and the signal on the output of the subtractor stage 21 is smaller by at least one-half and the voltage on the base of the transistor 33 is less positive. Transistor 32 is then conductive, so that on the base of the transistor 38 a voltage appears which is lower relative to $+U_B$, while the transistor 33 is cut off and on the base and emitter of the transistor 39 and on the base of the transistor 38 a voltage appears which almost corresponds to the supply voltage $+U_B$. The pnp-transistor 38 is then cut off.

However, when the switch 2 is in the incorrect phase position, the base voltages of the transistors 32 and 33 will be the other way round, and the transistor 38 is turned on, preferably in conjunction with the appearance of the pulses in the sampling voltage 27, so that on its grounded collector resistor 42, of for example 10 kohms, a positive pulse appears. Via a coupling capacitor 43 this pulse is transferred to a resistor 44 which is also grounded and via a diode 45 to a further grounded resistor 46. The positive voltage variation thus appearing across resistor 46, in a manner-known per se, produces the desired change of the switching phase via the controller 13 by means of the actuator 11, for example by suspending one of the switching changes of the change-over switch 2. The diode 45 serves to ensure that the voltage of opposite polarity across resistor 44 after the d.c. decoupling via capacitor 43 is not transferred. This part of the circuit may be modified arbitrarily, if the control input of the actuating stage 11 permits or requires this.

The voltage appearing across the output capacitor 30 of the low-pass filter 28, 30 is applied directly to the base of transistor 32. Suitably, the output voltage of the other low-pass filter is applied from the capacitor 31 to the base of the transistor 33 via a voltage divider comprising a 5-kohm resistor 51 and a 10-Kohm resistor 52. This ensures that if voltages of approximately the same magnitude appear at the combination stages 6 and 21, for example in the absence of a chrominance signal, the transistor 33 is cut off, thus correction pulses from being transferred to the actuation stage 11, 13. The correction arrangement described is not rendered operative until the voltages on the output of the stage 21 are appreciably higher than on the output of the stage 6.

In a different switching system the phase of the chrominance carrier is changed every four lines, i.e. continuously over both fields. Also in this case it is necessary to ensure that during playback, switching is effected in the correct sequence relative to the switching effected during recording, in order that useful signals, from which crosstalk components have been removed by the comb filter circuit, are continuously available on the output terminal 8. In the Figure, the circuit sections required for this purpose are represented by dash-dot lines, while the connections which are then not operative are indicated by an interrupted cross inserted in the relevant line; the circuit sections which are connected by these lines but which are then inoperative may then obviously be dispensed with.

The second change-over switch 14, 15, 16 is then not necessary; the output terminal 4 of the first change-over switch is permanently connected to the input point 5 of the comb filter circuit 6, 7 via the polarity changer 17. In this switching system the first change-over switch 2 is changed over every four lines by the actuator 11. This is realised by means of a controller 61, to which the required signals, for example pulses of line frequency $f_z$, are applied from a terminal 62 and which includes a corresponding frequency divider. The correction signal appearing across the resistor 46 is applied via an AND-gate 63, which on its other input receives a pulse from a terminal 64, for example during the vertical flyback period, i.e. with the vertical frequency. If at the same time a correction signal is available, the switching rhythm of the controller 61 is set shifted back by one line period by the output of the gate 63 via a further input, for example by means of the frequency divider contained in said unit and is thus corrected by a corresponding period of time. When the phase of the switching rhythm is not yet entirely in conformity with the rhythm contained in the recorded signal, another correction signal is generated and during the next field a further correction is performed until finally complete synchronism is obtained. The integration time (time constant) of the smoothing networks should then be smaller than one field interval of for example 20 msecs.

What is claimed is:

1. A circuit arrangement for detecting the switching phase of wave trains which periodically exhibit a fixed phase difference relative to a normal condition, in particular the color synchronizing pulses of a color television signal recorded on a video tape recorder, whose polarity changes from field to field, having delaying means and a compensation circuit which includes a first combination stage, in which the pulses, which have been restored to the normal condition, are combined, for example added, directly and delayed in said delaying means by a sampling interval, so that in the case of a correct switching rhythm, said first combination stage produces a signal having a maximum amplitude, characterized in that said circuit arrangement further comprises a second combination stage to which said direct and delayed signals are applied, a first and a second low-pass filter coupled respectively to said first and said second combination stage, and a comparator coupled to said first and said second low-pass filters, whereby in the event of an incorrect switching rhythm, said second combination stage produces a signal having a maximum amplitude while said first combination stage produces a signal having a minimum amplitude, causing said comparator to produce a correction signal.

2. A circuit arrangement as claimed in claim 1, characterized in that the output signals of the first and the second combination stage (6 and 21) are applied to amplitude demodulators (24 and 25 respectively).

3. A circuit arrangement as claimed in claim 2, characterized in that the amplitude demodulators are rendered operative by sampling pulses (27) only during the occurrence of reference signals, for example the color synchronizing signals.

4. A circuit arrangement as claimed in any one of the claims 2, 3 or 1, characterized in that said comparator is a differential amplifier and includes a voltage divider coupled to the signal from said second combination stage, whereby when said first and said second combination stages produce signals having substantially the same amplitude, which would indicate the absence of a chrominance signal, said comparator does not produce a correction signal.

5. A circuit arrangement as claimed in claim 4, which further comprises an actuation stage, having a control input, for controlling the switching rhythm and a diode for coupling said comparator to the control input of said actuation stage whereby said diode only allows signals of one polarity to be applied to said actuation stage.

6. A circuit arrangement for detecting the switching phase of wave trains which periodically exhibit a fixed phase difference relative to a normal condition, in particular the color synchronizing pulses of a color television signal recorded on a video tape recorder, said circuit arrangement comprising:

an input for said wave trains;

a compensation circuit having a first input directly coupled thereto and a second input having means for causing a phase change to a signal applied thereto;

a change-over switch, having a control input, for periodically coupling said input alternately to said first and said second inputs of said compensation circuit;

an actuation stage, having a control input, coupled to the control input of said change-over switch for causing said switch to change positions every four line periods in a television signal;

said compensation circuit including delaying means, a first and a second combination stage to each of which the signal, applied to either said first or said second input, is applied both directly and delayed in said delaying means; and a comparator coupled to said first and second combination stages for producing a correction signal when the signal from said second combination stage has a maximum amplitude and the signal from said first combination stage has a minimum amplitude, said correction signal being coupled to the control input of said actuation stage whereby, when said actuation stage is causing said change-over switch to change at an incorrect rhythm, said comparator produces said correction signal which thereby causes said actuation stage to be reset by one line period.

7. A circuit arrangement as claimed in claim 6, which further comprises an AND-gate having a first and a second input and an output, wherein said output is coupled to the control input of the actuation stage, the correction signal being applid to the first input thereof, and signals at the field frequency being applied to the second input of said AND-gate.

* * * * *